Feb. 4, 1958 K. WILFERT 2,822,505
BLINKER DIRECTION INDICATOR SIGNAL, PARTICULARLY
FOR MOTOR VEHICLES
Filed Oct. 2, 1951

Karl Wilfert
By: Austin, Dicke, Wilhelm & Padlon
ATTORNEY

United States Patent Office 2,822,505
Patented Feb. 4, 1958

2,822,505

BLINKER DIRECTION INDICATOR SIGNAL, PARTICULARLY FOR MOTOR VEHICLES

Karl Wilfert, Stuttgart-Degerloch, Germany, assignor to Daimler-Benz Aktiengesellschaft, Stuttgart-Unterturkheim, Germany Application October 2, 1951, Serial No. 249,321

2 Claims. (Cl. 315—82)

The invention relates to an arrangement for giving traffic signals by means of a blinker lamp, as used in motor vehicles as a direction indicator signal, in order to indicate an intended change of the driving direction. These blinker lamps must have a relatively great light intensity, in order to be sufficiently visible to the other participants of the traffic also in bright sunshine. However, it was found that they exercise in this case a dangerous glaring effect on other participants of the traffic, whereby they can cause accidents. It is an object of the invention to eliminate this shortcoming.

According to this it is a characteristic of the invention that the blinker lamps, which light up with great light intensity during day-time, i. e. with the main lights of the vehicle, such as the main headlights thereof, switched off, are wired in such a manner with regard to the other vehicle lighting system, such as the main headlights of the vehicle, that their light intensity is considerably reduced, when the other vehicle lighting system is switched on. According to a further characteristic of the invention, provision is made for this purpose for an additional resistor or rheostat, which is inserted in the circuit of the blinker lamps and which is forcibly short-circuited during switching off of the other vehicle lighting system by means of the switch, which serves for this purpose. According to a further characteristic of the invention a voltage is applied to a relay when the main vehicle lighting system is switched on which interrupts the short-circuit line of the voltage reducing rheostat, which line was closed before by stationary contacts.

Figure 1:
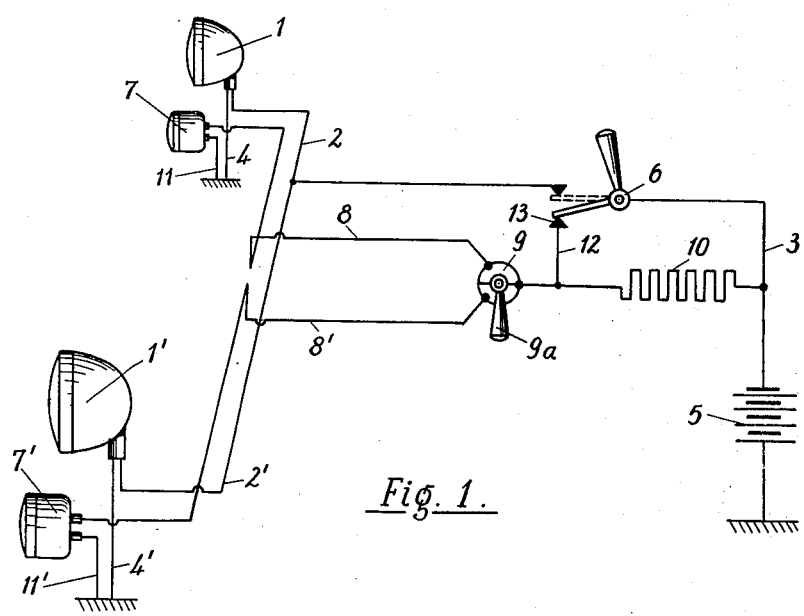
Figure 2:
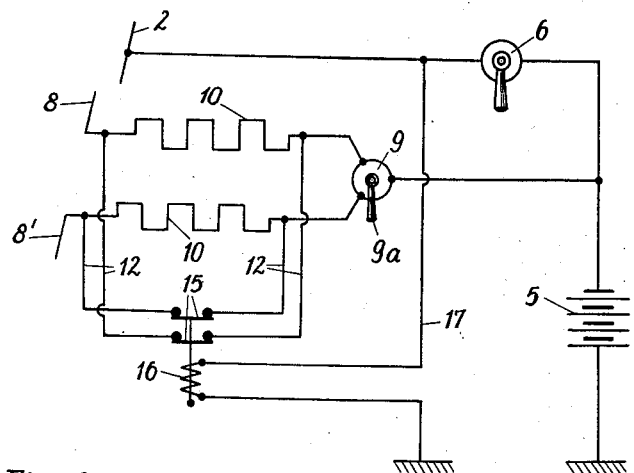

Two embodiments of the invention are shown in figures 1 and 2 of the drawing. In the drawing, in which like reference numerals are used to designate like parts in the two figures thereof, reference numerals 1 and 1' designate the main headlights, which are parts of the lighting system of a vehicle and which are connected with the vehicle battery 5 constituting an electrical source of power as well as with the ground or mass of the vehicle by lines 2, 2', 3, 4, 4' and which can be switched on and off by a switch 6. The blinker lamps 7, 7', which serve for indicating the driving direction, are connected by lines 8, 8' over a switch 9 and a voltage reducing resistor or rheostat 10 with the line 3 and thereby with the vehicle battery 5, as well as by lines 11, 11' with the ground or mass of the vehicle. The switch 9 is constructed in the known manner as a socalled blinker switch, by which according to the position of the operating lever 9a either the blinker lamp 7 on the one side of the vehicle or the blinker lamp 7' on the other side of the vehicle can be switched on, in order to indicate an intended change of the driving direction towards the respective side.

In Fig. 1 a short-circuit line 12 is arranged between the switch 9 and the rheostat 10, which line leads to a stationary contact 13 of the switch 6. This contact is brought into connection with the line 3 upon switching off of the vehicle main lights 1 and 1' by the switch 6, whereby the rheostat 10 is bridged, so that with switched-off vehicle main lights 1 and 1' the full battery voltage is applied across the blinker lamps 7 and 7' and the latter light up with appropriately great light intensity upon operating switch 9. During switching-on of the main headlights 1 and 1', which, as a rule, is only effected in the darkness, the line 12, on the contrary, is forcibly separated from the line 3 by the switch 6, so that the current for the blinker lamps 7, 7' must now take its way through the rheostat 10 and thereby the light intensity of the blinker lamps 7 and 7' is considerably reduced.

In Fig. 2 one voltage reducing resistor or rheostat 10 each is arranged between the switch 9 and the two blinker lights 7 and 7'. The rheostats 10 are with switched-off vehicle main lights 1 and 1' bridged by short circuit lines 12, whereby the relay 6 is de-energized and the stationary contacts 15 of a switching relay are closed. Upon switching on of the vehicle main lights 1 and 1' by means of the switch 6 the relay 16 is at the same time connected with full voltage existing across the electrical source 5 over a line 17, so that the relay opens the contacts 15 and thereby interrupts the short circuit lines 12. The result is that in this case also the blinker lamps are energized with switched-on vehicle main lights 1 and 1' with smaller brightness than during day time.

The invention is not restricted to the illustrated embodiments of construction, but it can be varied at discretion within the scope of the individual characteristics of the invention.

What I claim is:

1. A switching arrangement for dimming blinking directional indicator lights for vehicles comprising main headlights, directional indicator lights, a source of electrical energy, a first circuit connected between said source and said directional indicator lights including blinker switch means and a current reducing resistor, a second circuit connected between said source and said main headlights, a single pole double throw switch in said second circuit with the contact arm thereof permanently connected by a part of said second circuit with said source and one contact of said switch permanently connected by another part of said second circuit with said headlights, a second contact in said switch, and a third circuit inter- connecting said second contact with said first circuit intermediate said resistor and said directional indicator lights, whereby the resistor is normally shorted with the contact arm of said switch establishing a connection with said second contact to produce full intensity of the directional indicator lights and wherein the indicator lights are dimmed upon energizing the main headlights by switching the contact arm of said switch over to the first contact thereof.

2. A control arrangement for dimming the directional indicator lights during night driving in a vehicle comprising headlights, blinking directional indicator lights, a source of electrical power, first circuit means including a normally open single pole switch means between said source and said headlights for connecting said headlights with said source, second circuit means including normally short-circuited current limiting resistor means and turn indicator blinker-type switch means between said source and said indicator lights for connecting said indicator lights with said source, and third circuit means connected with said single pole switch means for opening the short circuit of said resistor means upon closing of said first circuit by said switch means, whereby the indicator lights are dimmed with energization of the main headlights.

References Cited in the file of this patent

UNITED STATES PATENTS

| | | |
|---|---|---|
| 1,614,491 | Potter | Jan. 18, 1927 |
| 1,740,777 | Murray | Dec. 24, 1929 |
| 2,005,963 | Axelberg | June 25, 1935 |
| 2,122,508 | Bell | July 5, 1938 |
| 2,562,275 | Hollins | July 31, 1951 |